(No Model.)
N. KIDNEY.
Ice Cream Freezer.
No. 236,040. Patented Dec. 28, 1880.
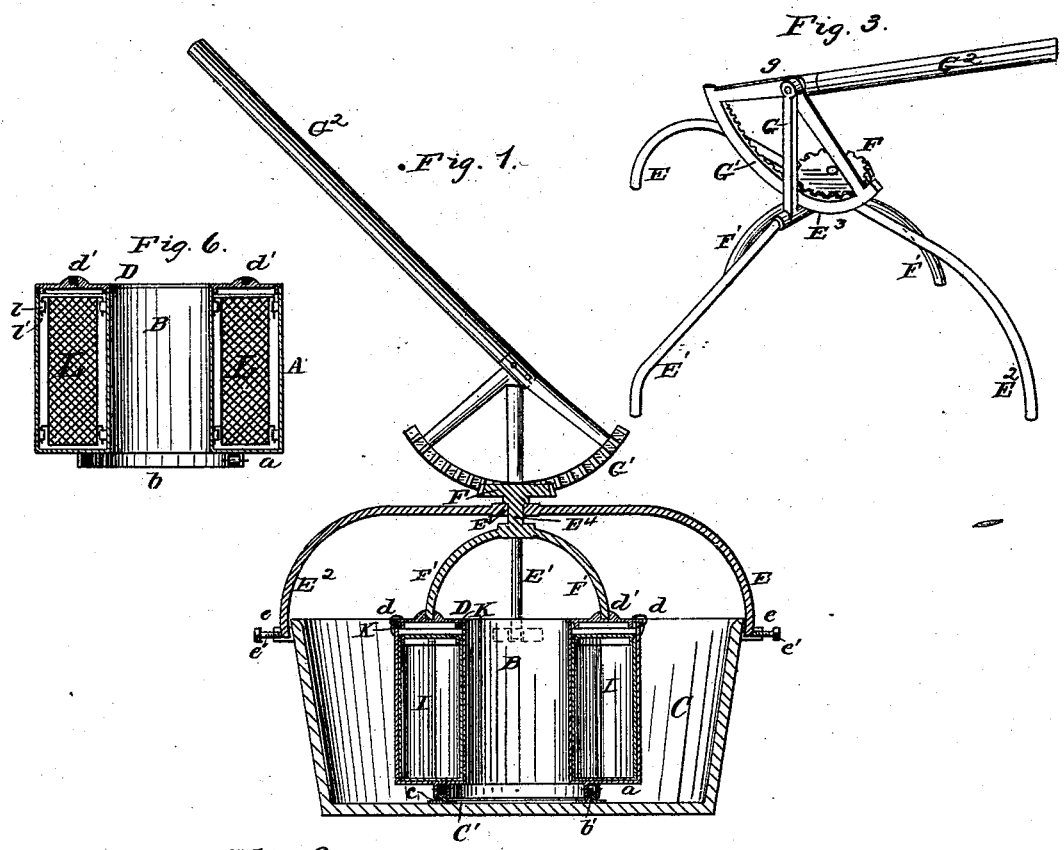
Witnesses:—
H. N. Low
J. S. Barker
Inventor:—
Nelson Kidney
by Doubleday and Bliss
att'ys

UNITED STATES PATENT OFFICE.

NELSON KIDNEY, OF DUNKIRK, ASSIGNOR OF ONE-HALF TO E. HARLOW COOK, OF FOREST, OHIO.

ICE-CREAM FREEZER.

SPECIFICATION forming part of Letters Patent No. 236,040, dated December 28, 1880.

Application filed June 15, 1880. (No model.)

*To all whom it may concern:*

Be it known that I, NELSON KIDNEY, of Dunkirk, in the county of Hardin and State of Ohio, have invented certain new and useful Improvements in Ice-Cream Freezers and Churns; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a central vertical section of my improved device when arranged for freezing cream. Fig. 2 is a perspective view of the cylinder for holding the milk or cream. Fig. 3 is a perspective view of the devices for imparting motion to the rotating parts. Fig. 4 is a perspective of a supplemental cream-can and its cover detached. Fig. 5 is a bottom-plan view of the rotating cylinder shown in Fig. 2, and Fig. 6 is a vertical section of the rotating cylinder when arranged for churning.

In the drawings, A represents an outer cylinder, and B a smaller cylinder, arranged centrally within the cylinder A, and connected therewith by a tight annular bottom, $a$. There is thus formed a chamber substantially annular in cross-section.

C represents an outside tub or vessel for supporting the cylinder and the devices for operating it. When cream is to be frozen, ice or a freezing-mixture is packed between the rotating cylinder A B and the tub C, and also in the central open space within the cylinder. Upon the bottom of the outer vessel, C, there is secured a plate, C', having an upwardly-projecting rib or guide, $c$. The bottom of the cylinder A B is formed with a way, B', Fig. 5, either by recessing the same upwardly from the plane of the bottom $a$ or by attaching downwardly-projecting flanges $b$. $b'$ $b'$ are anti-friction rollers mounted within the way or groove B', which latter fits over the rib $c$ on the bottom of the outer vessel, the rollers $b'$ resting on the top of the said rib.

D represents an annular cover arranged to fit tightly the top of the cylinders A B, and to close the chamber formed thereby, it being held in place by means of suitable clamps, $d$. Upon the upper side of the cap or cover D are formed sockets $d'$, to receive the rotating arms.

E E' E$^2$ represent the legs of a tripod-frame. At their outer ends they are rigidly secured to the top of the vessel C by means of sockets $e$ and clamping-screws $e'$ $e'$, and at their inner ends are connected together by means of a joint, E$^3$. Through the center of the frame thus formed an aperture is made to provide a bearing for a short shaft, E$^4$, which latter carries a spur-wheel, F, above the tripod-frame and downwardly-curved arms F' F' below the frame. These arms F' can fit into the socket $d'$, and thus engage with the rotating cylinder.

An upright, G, is cast with the joint E$^3$. It has at its upper end a bearing at $g$ for a cogged segment, G'. G$^2$ is a handle attached to the segment for operating the mechanism.

The teeth of the segment G' are preferably equal in number to those on the spur-wheel F, so that one reciprocation of handle G$^2$ will cause one revolution of the cylinder A B in each direction.

When these devices are to be used for freezing cream, supplemental cans I are employed. These cans are preferably of the form shown in Fig. 4, having curved inner and outer faces adapted to fit snugly within the annular space between walls A and B of the rotating cylinder, each can being provided with a tight cap or cover, I'. Four of these cans are shown, (see Fig. 2,) though a greater or less number may be used, if desired. By using these separate detachable cans I am not only enabled to lift or remove one or more of the cans from the cylinder without in any wise altering the position of the cylinder, but, moreover, am enabled to freeze separately bodies of cream having different flavors at one operation.

When it is desired to use the agitating devices for churning, the milk or cream is placed within the annular space between the walls A and B, which space is divided by means of devices suitable to break the flow of the milk or cream and agitate the same. For this purpose intersecting wires, such as shown at L, Fig. 6, may be used. The wires or other agitators may be supported within the rotating cylinder in any preferred manner, as by means of eyes $l$, Figs. 2 and 6, and hooks $l'$.

When the rotating cylinder is in operation (whether used for freezing or churning) the liquid is kept in constant agitation throughout its whole body, there being no place for it to be at rest, as would be the case were it constructed without the central hollow part, B.

I am aware that in freezing devices use has been made of a rotating annular can divided into compartments by permanent radial partitions; but to carry out the object of my invention it is necessary to so construct the can that it should have a continuous annular chamber, in order to permit it to be used both for freezing and for churning, in which latter case the cream must be permitted to flow back and forth as far as possible and be interfered with in its movements only by a dasher or agitator.

K K represent rubber packings attached to the under side of the cover D, adapted to form perfectly-tight joints between said cover and the walls A B, so that no salt or brine or water or other undesirable material can pass from the outside to the inside of the cylinder.

What I claim is—

In a device for agitating cream, the combination, with the outer vessel, C, the rib $c'$, segment $G'$, the tripod-frame, and vertical shaft $E^4$, carrying arms $F'$ $F'$, of the rotating cylinder constructed with the outer wall, A, and the inner cylindrical wall, B, flanges $b$, cover D, and sockets $d'$, substantially as set forth.

In testimony that I claim the foregoing I have hereunto set my hand this 7th day of June, 1880.

NELSON KIDNEY.

Witnesses:
JAMES J. WOOD,
MILTON TANNER.